(12) United States Patent
Hattori et al.

(10) Patent No.: US 10,600,331 B2
(45) Date of Patent: Mar. 24, 2020

(54) INFORMATION PROCESSING APPARATUS AND NONTRANSITORY COMPUTER READABLE MEDIUM

(71) Applicant: FUJI XEROX CO., LTD., Tokyo (JP)

(72) Inventors: Keigo Hattori, Kanagawa (JP); Hirotake Sasaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/945,320

(22) Filed: Apr. 4, 2018

(65) Prior Publication Data

US 2019/0088150 A1   Mar. 21, 2019

(30) Foreign Application Priority Data

Sep. 20, 2017   (JP) .................................. 2017-179965

(51) Int. Cl.
*H04N 5/272* (2006.01)
*G09B 5/02* (2006.01)
*G06T 7/246* (2017.01)
*G09B 19/00* (2006.01)

(52) U.S. Cl.
CPC ................ *G09B 5/02* (2013.01); *G06T 7/246* (2017.01); *G09B 19/00* (2013.01); *H04N 5/272* (2013.01); *G06T 2207/10016* (2013.01)

(58) Field of Classification Search
CPC .......... H04N 5/272; G09B 5/02; G09B 19/00; G06T 7/426; G06T 2207/10016
USPC ......................................................... 348/564
See application file for complete search history.

(56) References Cited

U.S. PATENT DOCUMENTS

| 9,007,428 | B2* | 4/2015 | Zhou ................... H04N 5/2624 348/36 |
| 2008/0204566 | A1* | 8/2008 | Yamazaki ................ G03B 5/00 348/208.99 |
| 2012/0268609 | A1* | 10/2012 | Yoo ..................... G06K 9/00342 348/180 |
| 2017/0076497 | A1* | 3/2017 | Inomata ................. G06F 3/0346 |
| 2017/0249010 | A1* | 8/2017 | Jung ........................ G06F 3/011 |
| 2017/0363867 | A1* | 12/2017 | Poulos ............... G02B 27/0103 |
| 2017/0371408 | A1* | 12/2017 | Wilson ............... A61B 5/02438 |
| 2018/0093186 | A1* | 4/2018 | Black .................... A63F 13/213 |
| 2018/0184043 | A1* | 6/2018 | Namvar ................... H04N 7/10 |
| 2018/0338132 | A1* | 11/2018 | Rao Padebettu .... H04N 13/122 |

FOREIGN PATENT DOCUMENTS

| JP | 2006-40056 A | 2/2006 |
| JP | 2008-230575 A | 10/2008 |

* cited by examiner

*Primary Examiner* — Michael Lee
(74) *Attorney, Agent, or Firm* — Sughrue Mion, PLLC

(57) ABSTRACT

An information processing apparatus includes a detector and an instructor. The detector detects a motion of a video image viewed by a user. The instructor provides to the user an instruction to assume a posture in accordance with the motion of the video image detected by the detector.

18 Claims, 13 Drawing Sheets

WORLD COORDINATE SYSTEM
position = [x, y, z]
direction = [pitch, yaw, roll]

CAMERA COORDINATE SYSTEM
position' = [x', y', z']
direction' = [pitch', yaw', roll']

INFORMATION PROCESSING APPARATUS AND NONTRANSITORY COMPUTER READABLE MEDIUM

CROSS-REFERENCE TO RELATED APPLICATIONS

This application is based on and claims priority under 35 USC 119 from Japanese Patent Application No. 2017-179965 filed Sep. 20, 2017.

BACKGROUND

Technical Field

The present invention relates to an information processing apparatus and a non-transitory computer readable medium.

SUMMARY

According to an aspect of the invention, there is provided an information processing apparatus including a detector and an instructor. The detector detects a motion of a video image viewed by a user. The instructor provides to the user an instruction to assume a posture in accordance with the motion of the video image detected by the detector.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below with reference to the accompanying drawings.

First Exemplary Embodiment

Figure 1:
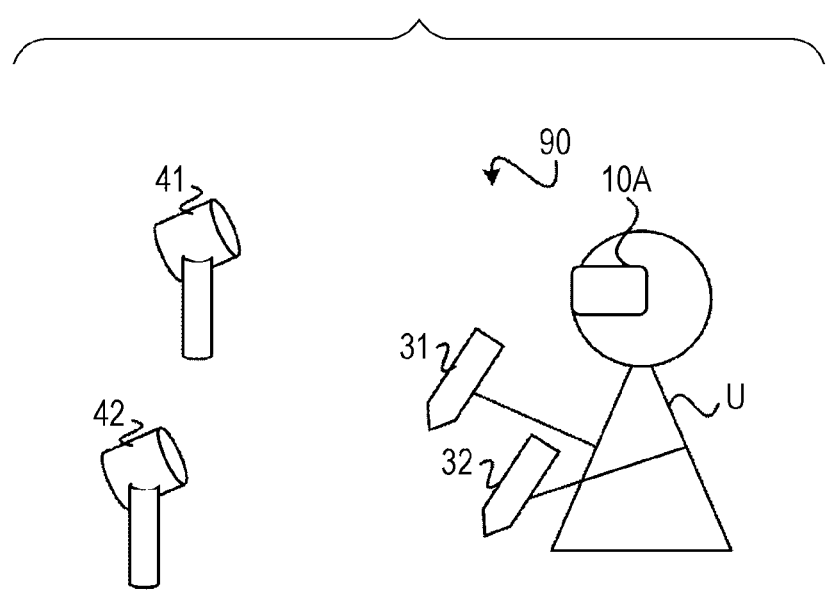
FIG. 1 is a schematic view illustrating an example of the configuration of an information processing system according to a first exemplary embodiment.

FIG. 1 is a schematic view illustrating an example of the configuration of an information processing system 90 according to a first exemplary embodiment.

As shown in FIG. 1, the information processing system 90 includes an information processing apparatus 10A, a first controller 31, a second controller 32, a first sensor 41, and a second sensor 42.

An example of the information processing apparatus 10A according to the first exemplary embodiment is integrally formed with a head-mounted display (HMD) provided with a display unit for displaying video images. The information processing apparatus 10A is worn on the head of a user U such that it blocks a field of view of the user U. This makes the user U feel highly immersed in viewing video images. The information processing apparatus 10A may alternatively be integrally formed with a wearable smart-glasses terminal provided with a display unit or be integrally formed with a desktop display device provided with a large screen.

As each of the first and second controllers 31 and 32, a controller with a vibration function may be used. This controller is used for performing various operations in accordance with video images displayed by the HMD. An example of a set of existing products of a HMD and a controller is Oculus Rift (registered trademark) and Oculus Touch (registered trademark). Other examples of a set of existing products are HTC Vive (registered trademark) and Oculus Touch and Microsoft Hololens (registered trademark) and Oculus Touch. In the first exemplary embodiment, the first controller 31 is held in the right hand of the user U, while the second controller 32 is held in the left hand of the user U.

A pair of the first and second sensors 41 and 42 detects the three-dimensional position and angle of the information processing apparatus 10A, and sends the detected position and angle to an external source as posture information indicating the posture of the user U. In the first exemplary embodiment, the three-dimensional position and angle of the information processing apparatus 10A (that is, the HMD) is regarded as the three-dimensional position and angle of the head of the user U. The pair of the first and second sensors 41 and 42 is constituted as a stereo camera, for example.

The information processing apparatus 10A is connected to the first and second controllers 31 and 32 and the first and second sensors 41 and 42 via wireless communication. The information processing apparatus 10A may alternatively be connected to these elements via wired communication.

Figure 2:
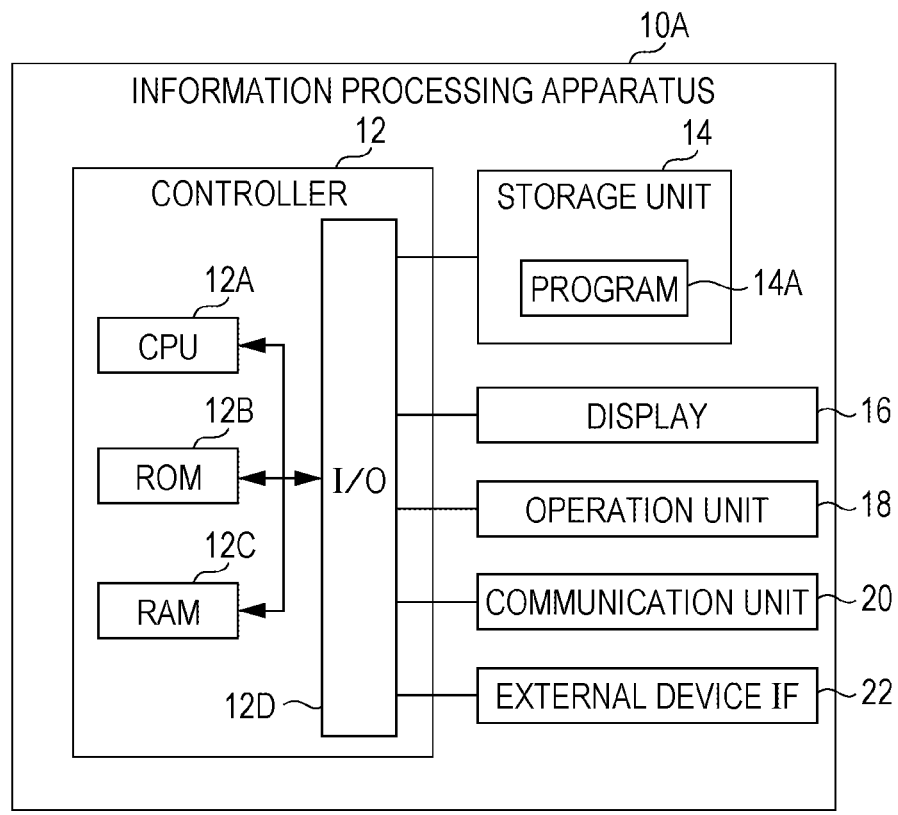
FIG. 2 is a block diagram illustrating an example of the configuration of an information processing apparatus according to the first exemplary embodiment.

FIG. 2 is a block diagram illustrating an example of the configuration of the information processing apparatus 10A according to the first exemplary embodiment.

The information processing apparatus 10A includes a controller 12, a storage unit 14, a display 16, an operation unit 18, a communication unit 20, and an external device interface (IF) 22.

The controller 12 includes a central processing unit (CPU) 12A, a read only memory (ROM) 12B, a random access memory (RAM) 12C, and an input/output IF 12D. These elements are connected to each other via a bus.

Functional elements including the storage unit 14, the display 16, the operation unit 18, the communication unit 20, and the external device IF 22 are connected to the input/output IF 12D. These functional elements and the CPU 12A can communicate with each other via the input/output IF 12D.

The controller 12 may be formed as part of a main controller that controls the entire operation of the information processing apparatus 10A. An integrated circuit (IC), such as a large scale integration (LSI) circuit, or an IC chipset may be used for some or all of the blocks forming the controller 12. In this case, each block may be formed by an individual circuit, or some or all of the blocks may be integrated into a single circuit. The blocks may be integrated with each other, or some blocks may be formed separately from the other blocks. In each block, part of a block may be formed separately from the other portions of the block. Instead of using an IC, such as an LSI circuit, a dedicated circuit or a general-purpose processor may be used for integrating the blocks of the controller 12.

As the storage unit 14, a hard disk drive (HDD), a solid state drive (SSD), or a flash memory may be used. In the storage unit 14, video images that can be played back by the information processing apparatus 10A are stored. A program 14A for executing posture instruction processing according to the first exemplary embodiment is also stored in the storage unit 14. The program 14A may alternatively be stored in the ROM 12B.

The program 14A may be installed in the information processing apparatus 10A in advance. The program 14A may be installed in the information processing apparatus 10A as a result of being stored in a non-volatile storage medium or being distributed via a network. Examples of the non-volatile storage medium are a compact disc-read only memory (CD-ROM), a magneto-optical disk, an HDD, a digital versatile disc (DVD)-ROM, a flash memory, and a memory card.

The display 16 displays video images selected by the user U. As the display 16, a liquid crystal display (LCD) or an organic electroluminescence (EL) display may be used.

The operation unit 18 includes a set of operation keys for receiving various instructions from the user U using the information processing apparatus 10A.

The communication unit 20 is connected to networks, such as a local area network (LAN) and a wide area network (WAN), so that it can communicate with an external server device via a network. Video images that can be played back by the information processing apparatus 10A may be stored in the external server device. In this case, the information processing apparatus 10A may obtain video images from the external server device.

The external device IF 22 is an IF used for allowing the information processing apparatus 10A to communicate with each of the first and second controllers 31 and 32 and the first and second sensors 41 and 42 via wireless communication. The external device IF 22 may connect to these elements via wired communication.

One of the reasons why the user U may feel carsick (motion sickness) while viewing video images displayed on the display 16 is that the user U does not assume a proper posture in accordance with the motion of video images. The information processing apparatus 10A thus provides to the user U an instruction to assume a proper posture in accordance with the motion of video images, thereby making the user U feel less sick.

Figure 3:
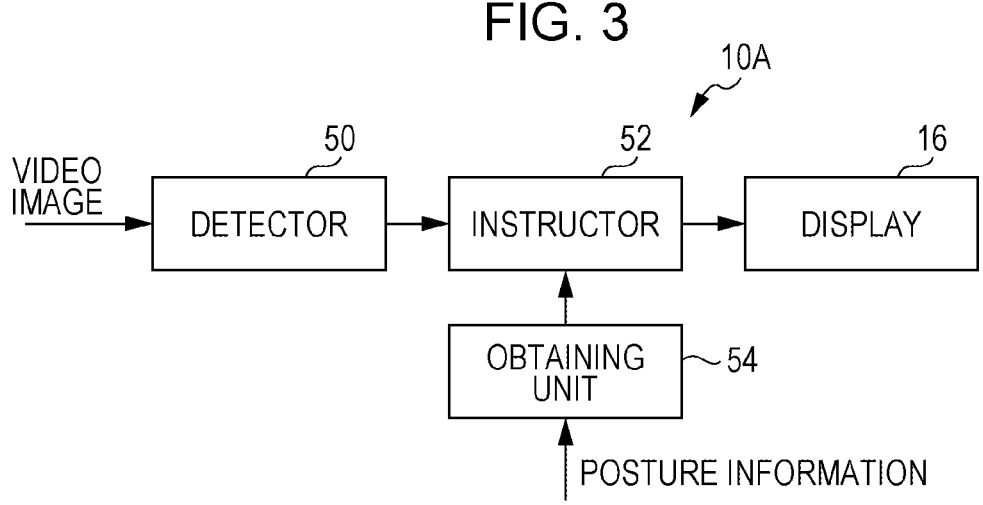
FIG. 3 is a block diagram illustrating an example of the functional configuration of the information processing apparatus according to the first exemplary embodiment.

As a result of writing the program 14A stored in the storage unit 14 into the RAM 12C and executing the program 14A, the CPU 12A of the information processing apparatus 10A functions as the elements shown in FIG. 3.

FIG. 3 is a block diagram illustrating an example of the functional configuration of the information processing apparatus 10A according to the first exemplary embodiment.

As shown in FIG. 3, the CPU 12A of the information processing apparatus 10A functions as a detector 50, an instructor 52, and an obtaining unit 54.

The detector 50 detects the motion of a video image viewed by the user U. An example of approaches to detecting the motion of a video image is to analyze the video image and to detect an optical flow using vectors which represent the motion of the video image. As another example, the following approach may be employed. An acceleration sensor and a gyroscope are fixed to a moving body, such as a vehicle, where video images are captured by using a camera mounted on the moving body. The acceleration sensor and the gyroscope measure the acceleration and angular velocity of the moving body while the camera is capturing video images. The values obtained by measurements are then associated with the video images in chronological order by using time stamps.

The instructor 52 instructs the user U to assume a proper posture in accordance with the motion of a video image detected by the detector 50. For example, if the moving direction of a video image is upward, downward, leftward, or rightward, the user U is more likely to feel sick. The instructor 52 thus instructs the user U to assume a proper posture in accordance with the moving direction of the video image. This will be discussed more specifically. If the moving direction of the video image is upward, the instructor 52 instructs the user U to assume a posture to make the head lean backward. If the moving direction of the video image is downward, the instructor 52 instructs the user U to assume a posture to make the head lean forward. If the moving direction of the video image is rightward, the instructor 52 instructs the user U to assume a posture to make the head lean leftward. If the moving direction of the video image is leftward, the instructor 52 instructs the user U to assume a posture to make the head lean rightward.

"Upward" refers to a direction in a range from the top right angle at 45 degrees to the top left angle at 45 degrees. "Downward" refers to a direction in a range from the bottom right angle at 45 degrees to the bottom left angle at 45 degrees. "Rightward" refers to a direction in a range from the top right angle at 45 degrees to the bottom right angle at 45 degrees. "Leftward" refers to a direction in a range from the top left angle at 45 degrees to the bottom left angle at 45 degrees.

If the motion of a video image is acceleration or deceleration, the user U is also more likely to feel sick. In this case, too, the instructor 52 instructs the user U to assume a proper posture in accordance with the motion of the video image. This will be discussed more specifically. If the motion of the video image is acceleration, the instructor 52 instructs the user U to assume a posture to make the head lean backward. If the motion of the video image is deceleration, the instructor 52 instructs the user U to assume a posture to make the head lean forward.

As the acceleration is greater, the instructor 52 may instruct the user U to make the head lean backward at a greater angle. As the deceleration is greater, the instructor 52 may instruct the user U to make the head lean forward at a greater angle.

Desirably, the instructor 52 provides an instruction to make the user U understand the instruction intuitively. The instructor 52 thus provides instructions as at least one of a visual instruction, a tactile instruction, and an auditory instruction. Specific examples of instructions provided by the instructor 52 will be discussed later.

If a marker 68, which will be discussed later, is constantly displayed as an instruction, the user U may feel distracted. Hence, the obtaining unit 54 obtains posture information indicating the posture of the user U from the first and second sensors 41 and 42. If the posture of the user U indicated by the obtained posture information is not a predetermined posture corresponding to the motion of a video image, the instructor 52 provides an instruction to assume the predetermined posture to the user U. If the posture of the user U indicated by the obtained posture information is the predetermined posture, the instructor 52 does not provide an instruction to assume the predetermined posture to the user U. In this case, the instructor 52 does not display the marker 68 on the display 16, for example.

A specific operation of the detector 50 will be discussed below with reference to FIGS. 4 and 5.

Figure 4:
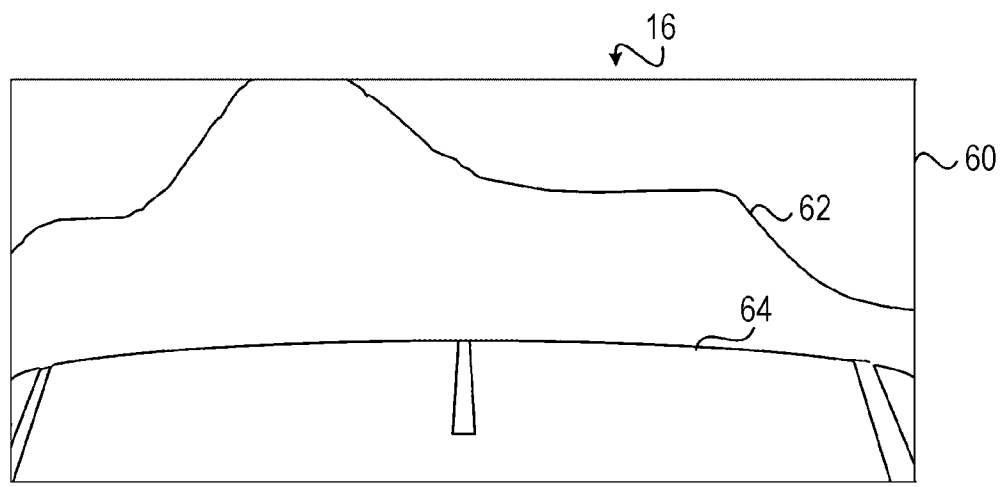
FIG. 4 is a front view illustrating an example of a video image according to an exemplary embodiment.

FIG. 4 is a front view illustrating an example of a video image 60 according to the exemplary embodiments.

The video image 60 is read from the storage unit 14 and is displayed on the display 16 in accordance with operation of the user U. The user U views the video image 60 displayed on the display 16.

The video image 60 is an image captured in a vehicle by a camera mounted on the vehicle. The vehicle is an example of a moving body. The video image 60 shows a scene as viewed from a driver driving on a road 64 toward a mountain 62 in the distance. Although the video image 60 is clipped as a rectangular shape for the sake of simple representation, it actually extends up to the viewing angle of the user U.

Figure 5:
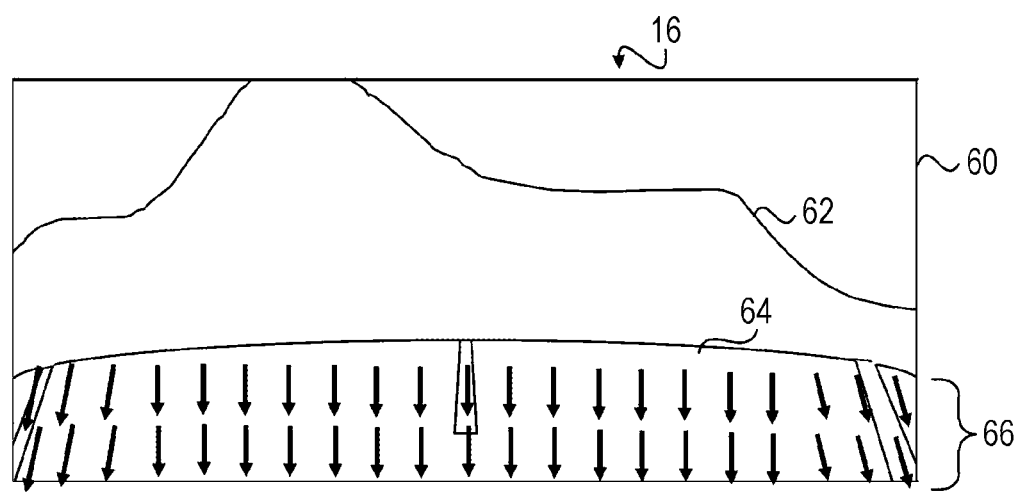
FIG. 5 is a view for explaining processing for detecting the motion of a video image according to an exemplary embodiment.

FIG. 5 is a view for explaining processing for detecting the motion of the video image 60 according to the exemplary embodiments.

The video image 60 is an image captured in a vehicle, as discussed above, and thus includes motions of the vehicle, such as accelerating, decelerating, right-turning, and left-turning motions. The detector 50 analyzes the motion of a specific object in the video image 60 so as to detect the direction and magnitude of the acceleration, for example. If the detector 50 detects the direction and magnitude of the acceleration only by using the video image 60, it detects an optical flow 66 by analyzing the video image 60.

If vectors in the detected optical flow 66 of the video image 60 face downward, as shown in FIG. 5, the vehicle is found to be heading forward. That is, detecting of the direction of the optical flow 66 can determine the moving direction of the video image 60. In this case, it is assumed that the moving direction of the video image 60 coincides with the heading direction of the vehicle. Detecting of the magnitude of the optical flow 66 can determine the degree of acceleration or deceleration.

Figure 6:
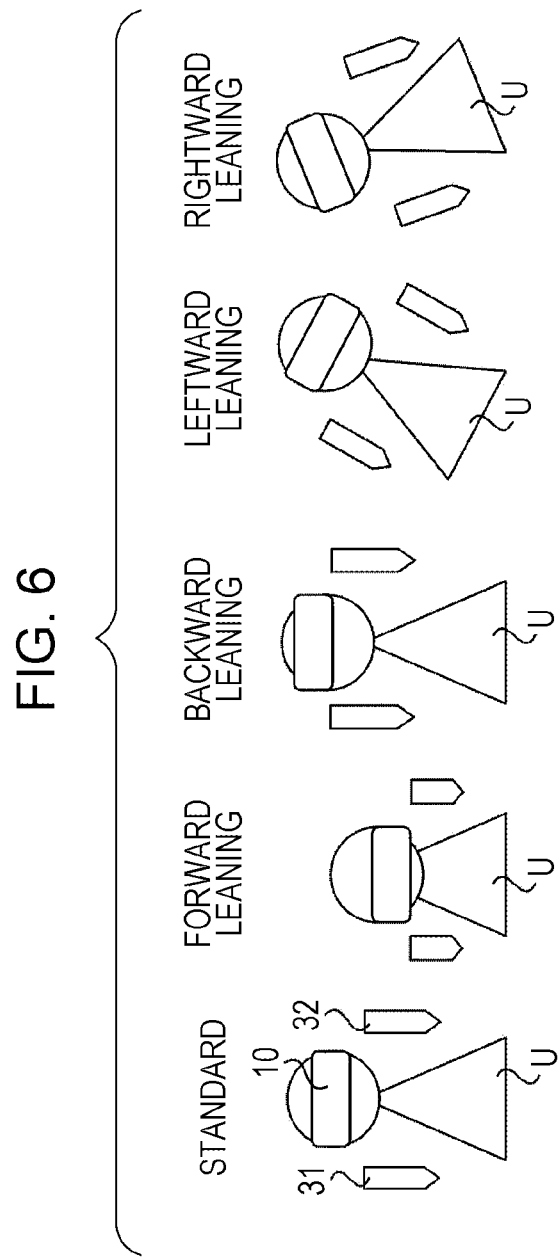
FIG. 6 illustrates examples of postures that a user may assume according to an exemplary embodiment.

FIG. 6 illustrates examples of postures that the user U may assume according to the exemplary embodiments.

In FIG. 6, the user U faces the near side of the drawing.

As shown in FIG. 6, the standard posture is a posture in which the user U faces in the horizontal direction (faces straight ahead). In the exemplary embodiments, "the user faces in the horizontal direction (faces straight ahead)" means that the user faces in a direction in a range of predetermined angles (±5 degrees, for example) with respect to the horizontal direction. A forward-leaning posture is a posture in which the face of the user U leans downward. In the exemplary embodiments, "leaning downward" means leaning downward at more than a predetermined angle (5 degrees, for example) with respect to the vertical direction. A backward-leaning posture is a posture in which the face of the user U leans upward. In the exemplary embodiments, "leaning upward" means leaning upward at more than a predetermined angle (5 degrees, for example) with respect to the vertical direction. A left-leaning posture is a posture in which the face of the user U leans to the left. In the exemplary embodiments, "leaning leftward" means leaning to the left at more than a predetermined angle (5 degrees, for example) with respect to the vertical direction. A right-leaning posture is a posture in which the face of the user U leans to the right. In the exemplary embodiments, "leaning rightward" means leaning to the right at more than a predetermined angle (5 degrees, for example) with respect to the vertical direction.

Specific operations when the instructor 52 provides a visual instruction will be discussed below with respect to FIGS. 7 through 14.

Figure 7:
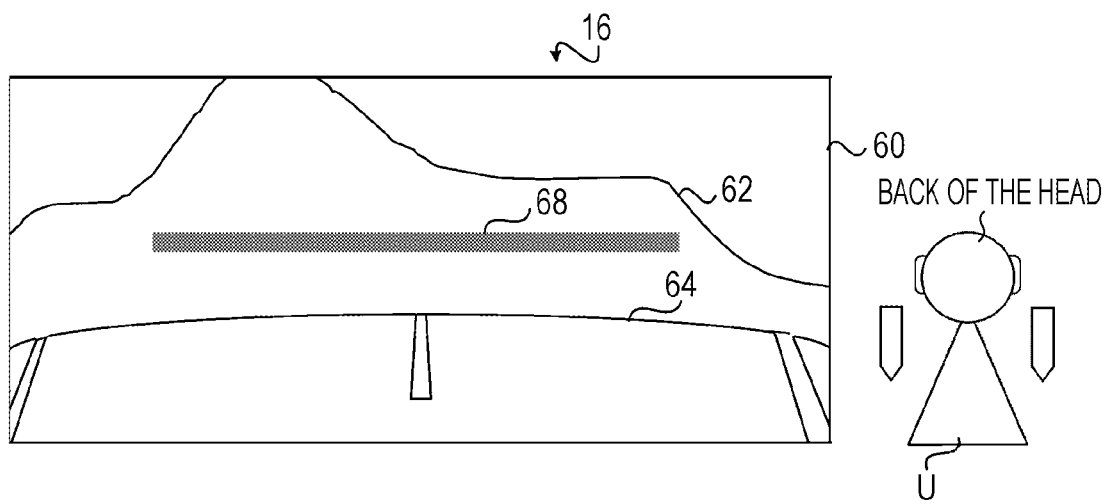
FIG. 7 illustrates an example of a marker displayed together with a video image and an example of the posture that a user is supposed to assume according to an exemplary embodiment.

FIG. 7 illustrates an example of a marker 68 displayed together with the video image 60 and an example of the posture that the user U is supposed to assume according to the exemplary embodiments.

In the exemplary embodiments, the marker 68 is an example of a visual instruction and is displayed translucently in the image 60. The shape of the marker 68 is only an example and is not restricted to an elongated rectangle.

As shown in FIG. 7, when a vehicle is driving straight at equal speed, the marker 68 is maintained at the standard shape. The standard shape of the marker 68 is an elongated rectangle, for example. In this case, the posture that the user U is supposed to assume is the standard posture. In FIGS. 7 through 14, the user U faces the far side of the drawing.

Figure 8:
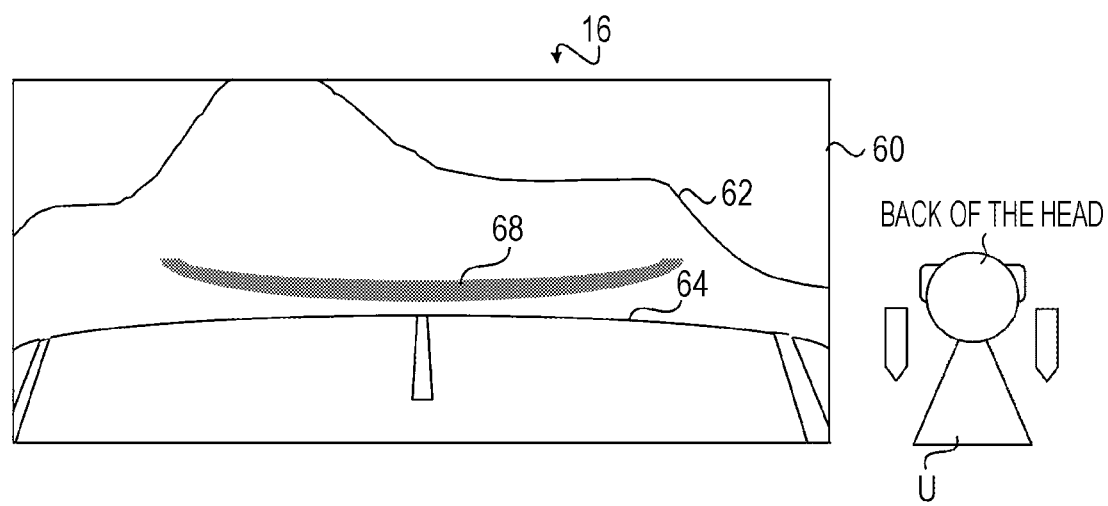
FIG. 8 illustrates an example of the marker and an example of the posture that a user is supposed to assume when the motion of a video image is gentle acceleration according to an exemplary embodiment.

FIG. 8 illustrates an example of the marker 68 and an example of the posture that the user U is supposed to assume when the motion of the video image 60 is gentle acceleration according to the exemplary embodiments.

As shown in FIG. 8, when the motion of the video image 60 is gentle acceleration, the shape of the marker 68 is changed in such a manner that the standard shape shown in FIG. 7 is slightly pulled downward. In the exemplary embodiments, if it is detected from the detection results of the optical flow 66 in FIG. 5 that the direction of the acceleration is downward and the magnitude thereof is small, the motion of the video image 60 is found to be gentle acceleration. In this case, the posture that the user U is supposed to assume is a slightly backward-leaning posture.

Figure 9:
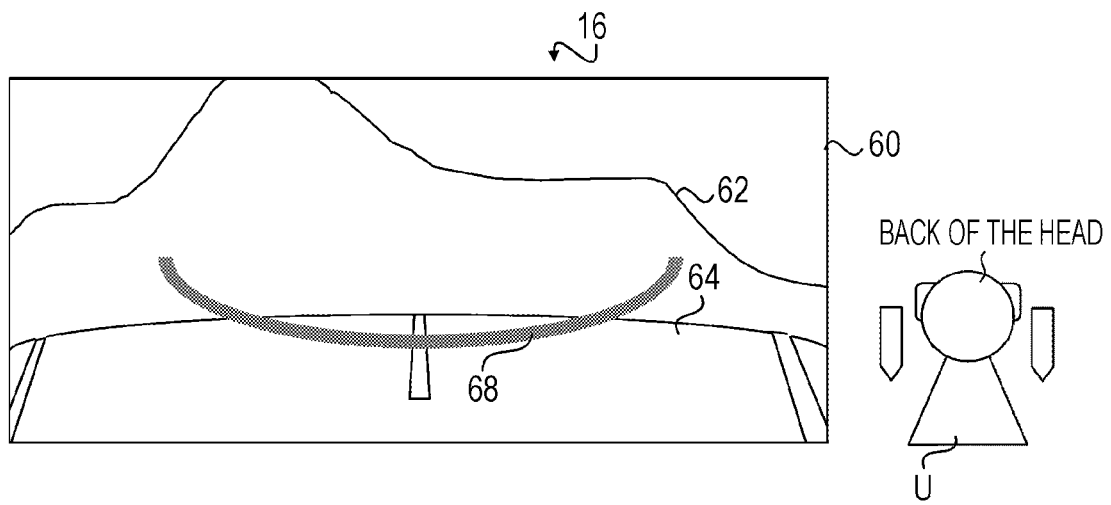
FIG. 9 illustrates an example of the marker and an example of the posture that a user is supposed to assume when the motion of a video image is hard acceleration according to an exemplary embodiment.

FIG. 9 illustrates an example of the marker 68 and an example of the posture that the user U is supposed to assume when the motion of the video image 60 is hard acceleration according to the exemplary embodiments.

As shown in FIG. 9, when the motion of the video image 60 is hard acceleration, the shape of the marker 68 is changed in such a manner that the standard shape shown in FIG. 7 is considerably pulled downward. In the exemplary embodiments, if it is detected from the detection results of the optical flow 66 in FIG. 5 that the direction of the acceleration is downward and the magnitude thereof is large, the motion of the video image 60 is found to be hard acceleration. In this manner, the degree by which the shape of the marker 68 is changed is adjusted in accordance with the magnitude of acceleration. In this case, the posture that the user U is supposed to assume is a greatly backward-leaning posture.

Figure 10:
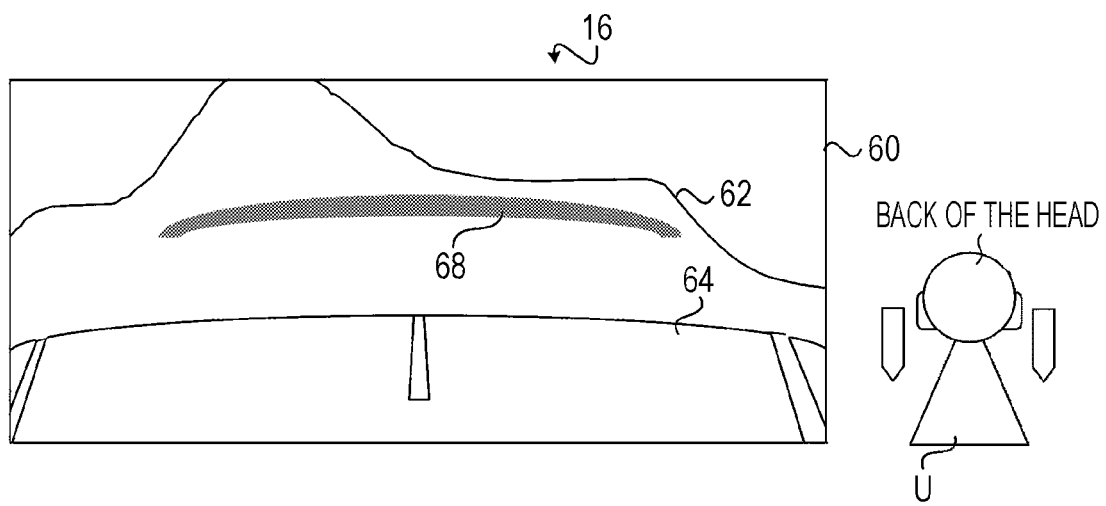
FIG. 10 illustrates an example of the marker and an example of the posture that a user is supposed to assume when the motion of a video image is gentle deceleration according to an exemplary embodiment.

FIG. 10 illustrates an example of the marker 68 and an example of the posture that the user U is supposed to assume when the motion of the video image 60 is gentle deceleration according to the exemplary embodiments.

As shown in FIG. 10, when the motion of the video image 60 is gentle deceleration, the shape of the marker 68 is changed in such a manner that the standard shape shown in FIG. 7 is slightly pulled upward. In the exemplary embodiments, if it is detected from the detection results of the optical flow 66 in FIG. 5 that the direction of the acceleration is upward and the magnitude thereof is small, the motion of the video image 60 is found to be gentle deceleration. In this case, the posture that the user U is supposed to assume is a slightly forward-leaning posture.

Figure 11:
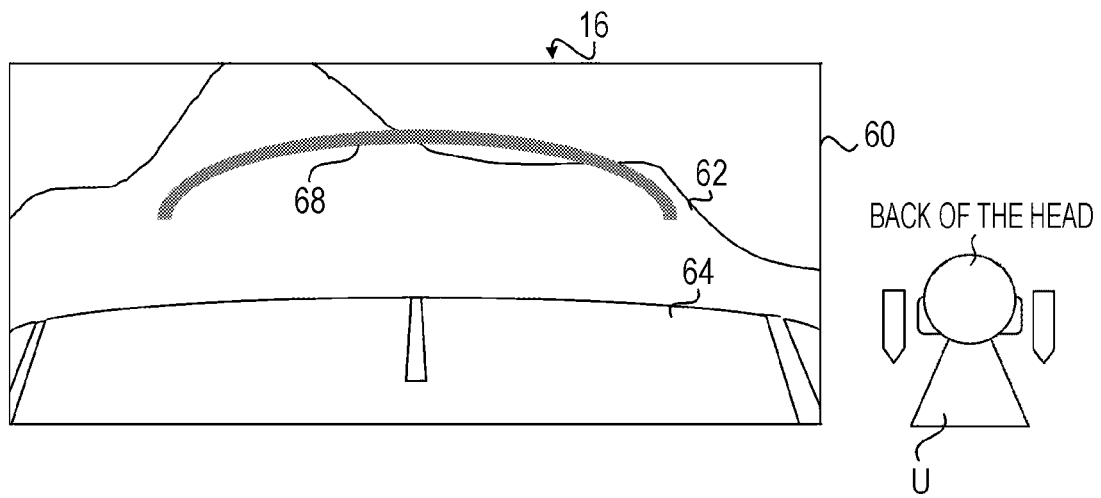
FIG. 11 illustrates an example of the marker and an example of the posture that a user is supposed to assume when the motion of a video image is hard deceleration according to an exemplary embodiment.

FIG. 11 illustrates an example of the marker 68 and an example of the posture that the user U is supposed to assume when the motion of the video image 60 is hard deceleration according to the exemplary embodiments.

As shown in FIG. 11, when the motion of the video image 60 is hard deceleration, the shape of the marker 68 is changed in such a manner that the standard shape shown in FIG. 7 is considerably pulled upward. In the exemplary embodiments, if it is detected from the detection results of the optical flow 66 in FIG. 5 that the direction of the acceleration is upward and the magnitude thereof is large, the motion of the video image 60 is found to be hard deceleration. As in hard acceleration in FIG. 9, the degree by which the shape of the marker 68 is changed is adjusted in accordance with the magnitude of acceleration. In this case, the posture that the user U is supposed to assume is a greatly forward-leaning posture.

Figure 12:
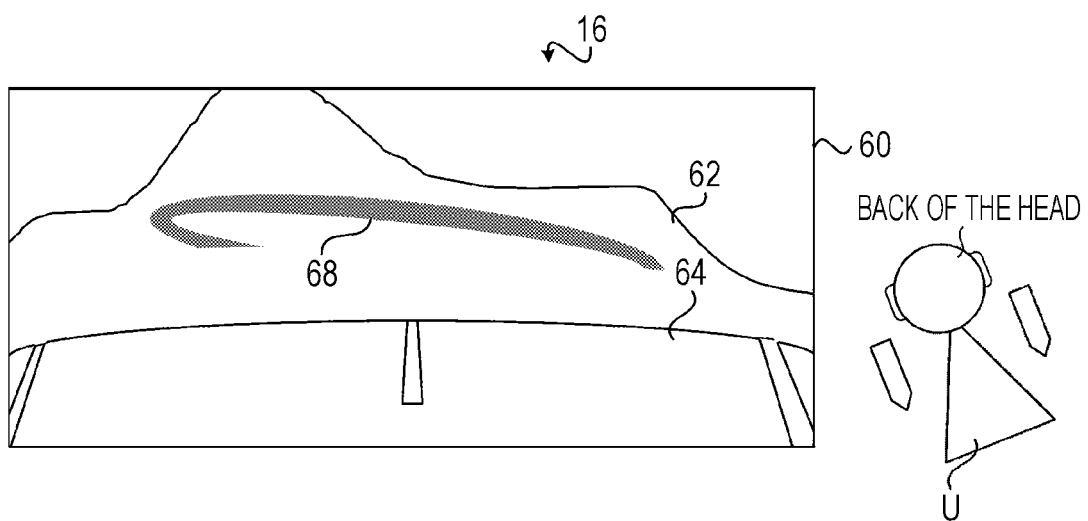
FIG. 12 illustrates an example of the marker and an example of the posture that a user is supposed to assume when the motion of a video image is a right-turning motion according to an exemplary embodiment.

FIG. 12 illustrates an example of the marker 68 and an example of the posture that the user U is supposed to assume when the motion of the video image 60 is a right-turning motion according to the exemplary embodiments.

As shown in FIG. 12, when the motion of the video image 60 is a right-turning motion having acceleration smaller than 0 (deceleration), the shape of the marker 68 is changed in such a manner that the standard shape shown in FIG. 7 is pulled in the top left direction. In the exemplary embodiments, if it is detected from the detection results of the optical flow 66 in FIG. 5 that the direction of the acceleration is the top left direction and the magnitude thereof is small, the motion of the video image 60 is found to be a right-turning motion. In this case, the posture that the user U is supposed to assume is a left-leaning posture.

Figure 13:
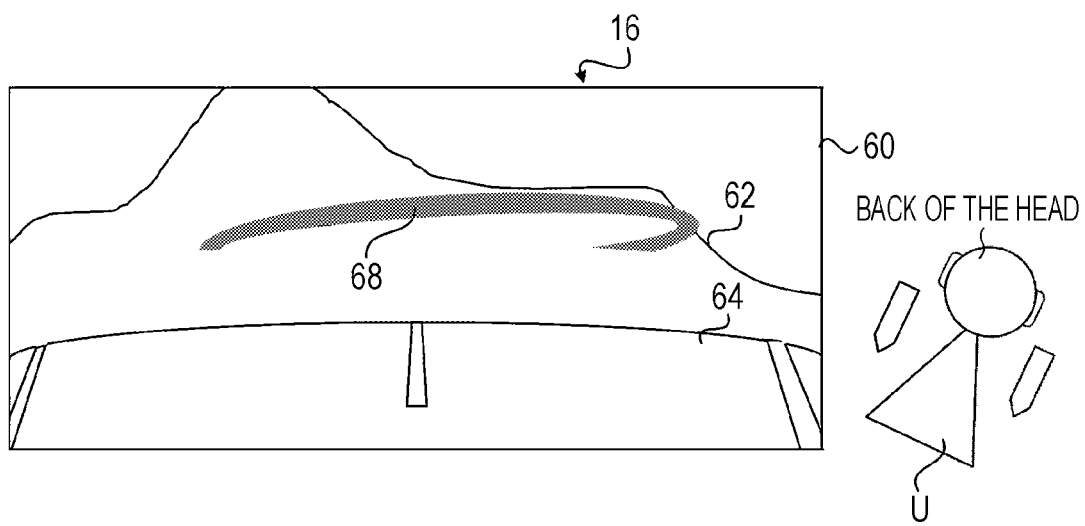
FIG. 13 illustrates an example of the marker and an example of the posture that a user is supposed to assume when the motion of a video image is a left-turning motion according to an exemplary embodiment.

FIG. 13 illustrates an example of the marker 68 and an example of the posture that the user U is supposed to assume when the motion of the video image 60 is a left-turning motion according to the exemplary embodiments.

As shown in FIG. 13, when the motion of the video image 60 is a left-turning motion having acceleration smaller than 0 (deceleration), the shape of the marker 68 is changed in such a manner that the standard shape shown in FIG. 7 is pulled in the top right direction. In the exemplary embodiments, if it is detected from the detection results of the optical flow 66 in FIG. 5 that the direction of the acceleration is the top right direction and the magnitude thereof is small, the motion of the video image 60 is found to be a left-turning motion. In this case, the posture that the user U is supposed to assume is a right-leaning posture.

Figure 14:
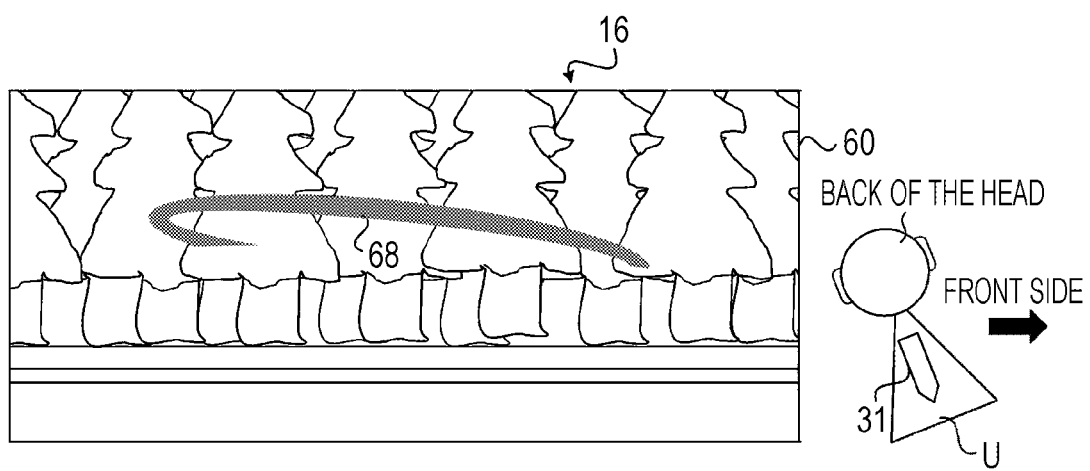
FIG. 14 illustrates another example of the marker and another example of the posture that a user is supposed to assume when the motion of a video image is gentle acceleration according to an exemplary embodiment.

FIG. 14 illustrates another example of the marker 68 and another example of the posture that the user U is supposed to assume when the motion of the video image 60 is gentle acceleration according to the exemplary embodiments.

In the examples shown in FIGS. 7 through 13, the shape of the marker 68 and the associated postures that the user U is supposed to assume when the user U faces forward have been discussed. In a virtual reality (VR) space, however, the user U can look around 360 degrees. It is thus desirable to change the shape of the marker 68 in accordance with the direction of the face of the user U.

It is assumed, as shown in FIG. 14, that the user U faces the left side (far side of the drawing) and the body faces the front side when the motion of the video image 60 is gentle acceleration. When the video image 60 accelerates in this state, the user U is supposed to assume a left-leaning posture. The direction of the face of the user U is detected by the first and second sensors 41 and 42. The instructor 52 provides an instruction by changing the shape of the marker 68 in accordance with the detected direction of the face of the user U.

To represent posture information according to the exemplary embodiments, a world coordinate system and a camera coordinate system are defined. The world coordinate system and the camera coordinate system will be described below with reference to FIG. 15.

Figure 15:
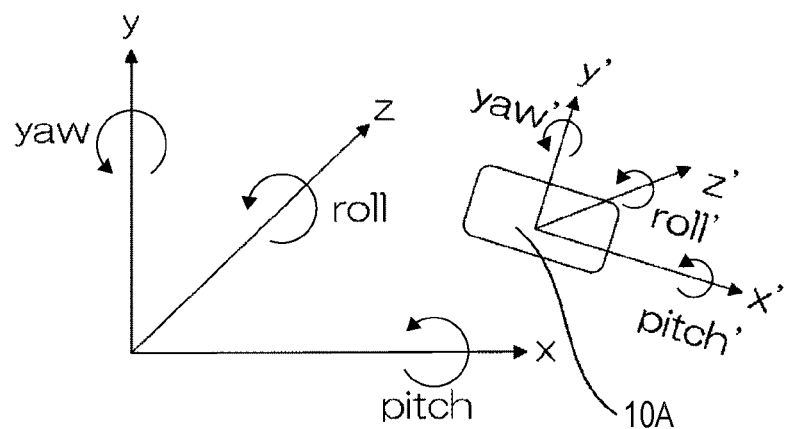
FIG. 15 shows diagrams for explaining the concepts of a world coordinate system and a camera coordinate system according to an exemplary embodiment.

FIG. 15 shows diagrams for explaining the concepts of the world coordinate system and the camera coordinate system according to the exemplary embodiments.

As the coordinate systems according to the exemplary embodiments, the world coordinate system representing the entirety of a certain space and the camera coordinate system principally representing the information processing apparatus 10A (HMD in the exemplary embodiments) are defined.

In the initial state, the world coordinate system and the camera coordinate system coincide with each other. The world coordinate system and the camera coordinate system each have the position and the angle. The position of the world coordinate system is represented by x, y, and z, while the angle (direction) thereof is represented by pitch, yaw, and roll. The position (position') of the camera coordinate system is represented by x', y', and z', while the angle (direction') thereof is represented by pitch', yaw', and roll'. Values of the angle and the position are described in the single-precision floating point format. The unit of the position is meter [m]. The angle takes a value of −1.0 to +1.0 (sine, cosine).

The first and second sensors 41 and 42 output the position and the angle of the information processing apparatus 10A with respect to the world coordinate system. In the exemplary embodiments, to instruct the user U to assume a proper posture, the force subjected in the world coordinate system is converted into that in the camera coordinate system. For example, the force in the z' direction in the camera coordinate system is represented by a moving distance mz' in the z' direction, and the force in the x' direction in the camera coordinate system is represented by a rotation distance mr' of the roll'.

The direction (radian) of the face of the user U is expressed by equation (1) by using the value of the yaw of the world coordinate system.

$$\text{radian} = \sin^{-1}(\text{yaw}) \quad (1)$$

By using the direction (radian) of the face of the user U, the force fz applied in the z direction and the force fx applied in the x direction of the world coordinate system are converted into the force fz' applied in the z' direction and the force fx' applied in the x' direction of the camera coordinate system according to equation (2):

$$fx' = \cos(\text{radian}) \times fx - \sin(\text{radian}) \times fz$$

$$fz' = \sin(\text{radian}) \times fx + \cos(\text{radian}) \times fz \quad (2)$$

where the unit of fx, fz, fx', and fz' is acceleration [G].

The rotation distance mr' of the roll' and the rotation distance mp' of the pitch' of the camera coordinate system are expressed by equation (3):

$$mr' = g(fx')$$

$$mp' = h(fz') \quad (3)$$

where g and h are generalized functions.

The range of the postures that the user U may assume is set to be a range in which the roll and the pitch of the world coordinate system are each −30 degrees to +30 degrees. It is said that, when the acceleration exceeds 0.3 G (absolute value), people find it suddenly accelerated (positive acceleration) or suddenly decelerated (negative acceleration). In the exemplary embodiments, the angle of 30 degrees is associated with any acceleration higher than 0.3 G, while the angle of −30 degrees is associated with any acceleration smaller than −0.3 G. Concerning a range of the acceleration of 0 to 0.3 G, the angle linearly represented by using functions g and h is associated with this range of acceleration. The functions g and h are expressed by equation (4):

$$g(a) = h(a) = \frac{100 \times a \times \pi}{180} \begin{cases} g(a) = h(a) = \frac{\pi}{6} & \text{if } a > 0.3 \\ g(a) = h(a) = -\frac{\pi}{6} & \text{if } a < -0.3 \end{cases} \quad (4)$$

where a is the acceleration.

The force in the z' direction in the camera coordinate system is represented by a moving distance in the z' direction, and thus, the rotation distance mp' of the pitch' is converted into the moving distance in the z' direction. In this case, it is necessary to reflect the sitting height T of the user U in the conversion result. If the sitting height T of the user U is 90 cm, for example, T=0.9. The moving distance mz' in the z' direction is expressed by equation (5).

$$mz' \times T \times \sin(mp') \quad (5)$$

Based on the moving distance mz' in the z' direction and the rotation distance mr' of the roll' in the camera coordinate system calculated as described above, the shape of the marker 68 is changed. The rough angle of the ideal posture that the user U is supposed to assume may also be displayed.

The timing at which an instruction is provided to the user U by using the marker 68 will be discussed below.

To make the user U feel less sick as a result of viewing the video image 60, it may be necessary to provide an instruction by using the marker 68 before an accelerating, decelerating, right-turning, or left-turning motion starts in the video image 60. If stored video images 60 are played back, the motion of the video images 60 may be analyzed in advance, and an instruction using the marker 68 may be displayed a few frames before a frame containing an accelerating, decelerating, right-turning, or left-turning motion. If the video images 60 are played back in real time, the following two methods may be employed. The two methods may be used singly or together.

A first method is a method based on estimation. For example, a corresponding one of accelerating, decelerating, right-turning, and left-turning motions is estimated, and the estimation result is reflected in an instruction using the marker 68. The motion at time t+1 is possible to estimate from the previous motions up to time t. An existing method, such as regression analysis, Kalman filtering, or recurrent neural network (RNN), may be used. A second method is a method based on delaying. The video images 60 are played back so as to let the user U view a frame slightly earlier than a frame that the user U is supposed to view at a certain time. That is, the marker 68 displayed in a frame that the user U is viewing at a certain time actually reflects the motion of a frame to be displayed at a later time.

Figure 16:
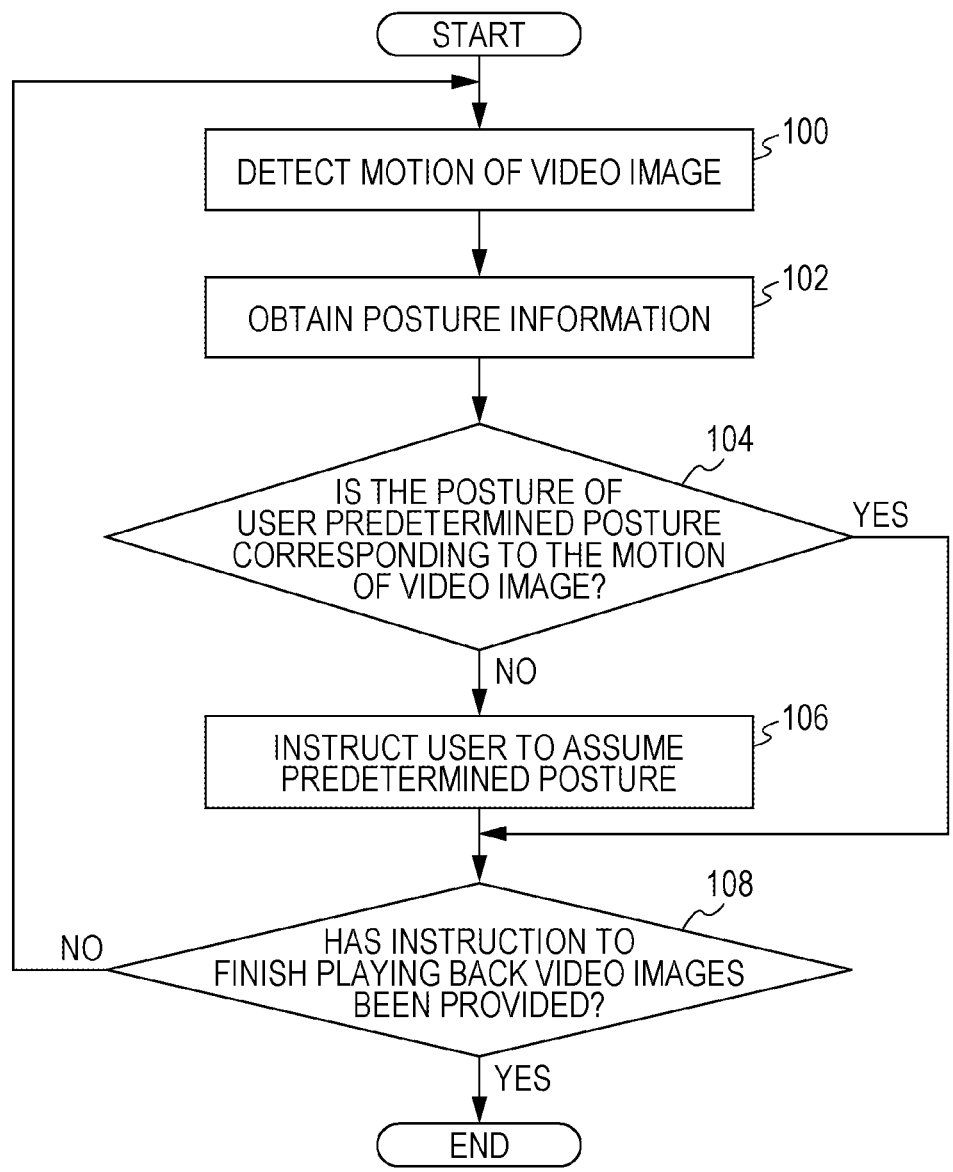
FIG. 16 is a flowchart illustrating an example of processing of a program according to the first exemplary embodiment.

The operation of the information processing apparatus 10A according to the first exemplary embodiment will be described below with reference to FIG. 16. FIG. 16 is a flowchart illustrating an example of processing of the program 14A according to the first exemplary embodiment.

In response to an instruction to execute the program 14A as a result of a user performing operation, the information processing apparatus 10A reads video images selected by the user from the storage unit 14 and displays them on the display 16.

In step 100, the detector 50 detects the motion of a video image displayed on the display 16.

In step 102, the obtaining unit 54 obtains posture information indicating the posture of the user from the first and second sensors 41 and 42.

In step 104, based on the motion of the video image detected by the detector 50 and the posture information obtained by the obtaining unit 54, the instructor 52 judges whether the posture of the user is a predetermined posture corresponding to the motion of the video image. If the posture of the user is found to be the predetermined posture (YES in step 104), the process proceeds to step 108. If the posture of the user is not found to be the predetermined posture (NO in step 104), the process proceeds to step 106.

In step 106, the instructor 52 instructs the user to assume the predetermined posture by using the marker 68, as discussed with reference to FIGS. 7 through 14.

In step 108, the instructor 52 judges whether an instruction to finish playing back the video images has been provided. If such an instruction has been provided (YES in step 108), the processing of the program 14A is terminated. If such an instruction has not been provided (NO in step 108), the process returns to step 100, and steps 100 through 108 are repeated.

In the first exemplary embodiment, an instruction is provided to the user U only when the posture of the user U is not the predetermined posture corresponding to the motion of the video image 60. However, an instruction may be provided to the user U regardless of whether the posture of the user U is the predetermined posture.

Second Exemplary Embodiment

Figure 17:
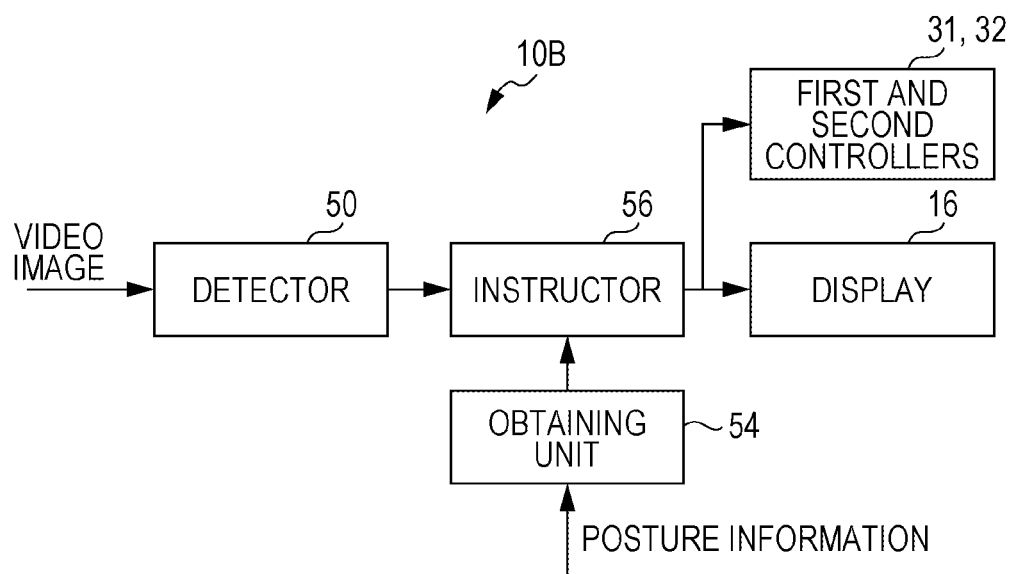
FIG. 17 is a block diagram illustrating an example of the functional configuration of an information processing apparatus according to a second exemplary embodiment.

FIG. 17 is a block diagram illustrating an example of the functional configuration of an information processing apparatus 10B according to a second exemplary embodiment.

As shown in FIG. 17, the information processing apparatus 10B includes a detector 50, an instructor 56, an obtaining unit 54, a display 16, and first and second controllers 31 and 32. Elements having the same functions as those of the first exemplary embodiment are designated by like reference numerals, and an explanation thereof will thus be omitted.

The first and second controllers 31 and 32 in the second exemplary embodiment are an example of a vibrating member which contacts part of the body of the user U to provide a tactile instruction to the user U. In the second exemplary embodiment, the first controller 31 is held in the right hand of the user U, while the second controller 32 is held in the left hand of the user U, as shown in FIG. 1.

The instructor 56 provides an instruction by changing the state of vibration of each of the first and second controllers 31 and 32 in accordance with the motion of a video image. A specific example will be discussed below with reference to FIG. 18.

Figure 18:
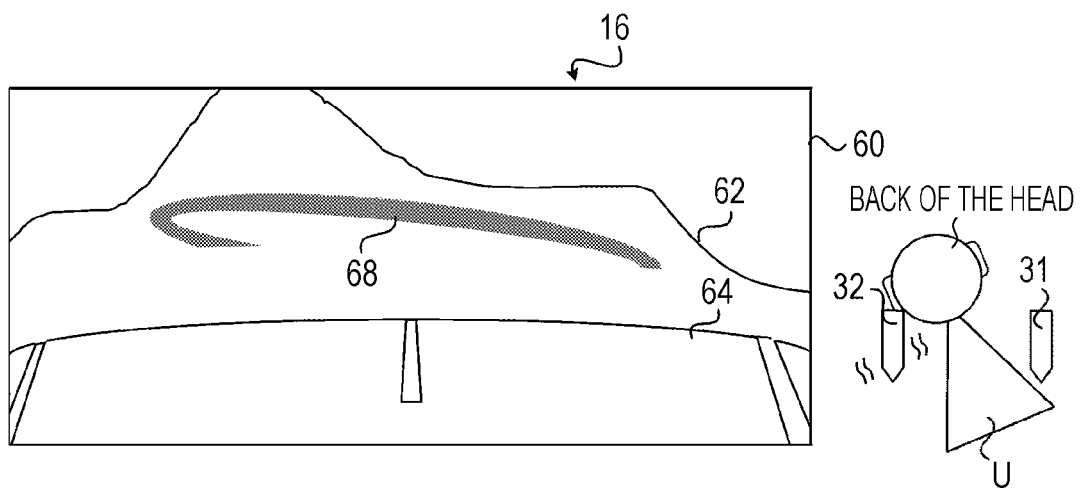
FIG. 18 illustrates an example of the marker and an example of the posture that a user is supposed to assume when the motion of a video image is a right-turning motion according to the second exemplary embodiment.

FIG. 18 illustrates an example of the marker 68 and an example of the posture that the user U is supposed to assume when the motion of the video image 60 is a right-turning motion according to the second exemplary embodiment.

As shown in FIG. 18, when the motion of the video image 60 is a right-turning motion having acceleration smaller than 0 (deceleration), the shape of the marker 68 is changed in such a manner that the standard shape shown in FIG. 7 is pulled in the top left direction. The instructor 56 also vibrates the second controller 52 held in the left hand of the user U to instruct the user U to assume a left-leaning posture. The first and second sensors 41 and 42 detect the three-dimensional position of the head of the user U. As the head of the user U approaches a suitable position, the instructor 56 may attenuate the vibration of the second controller 32.

Figure 19:
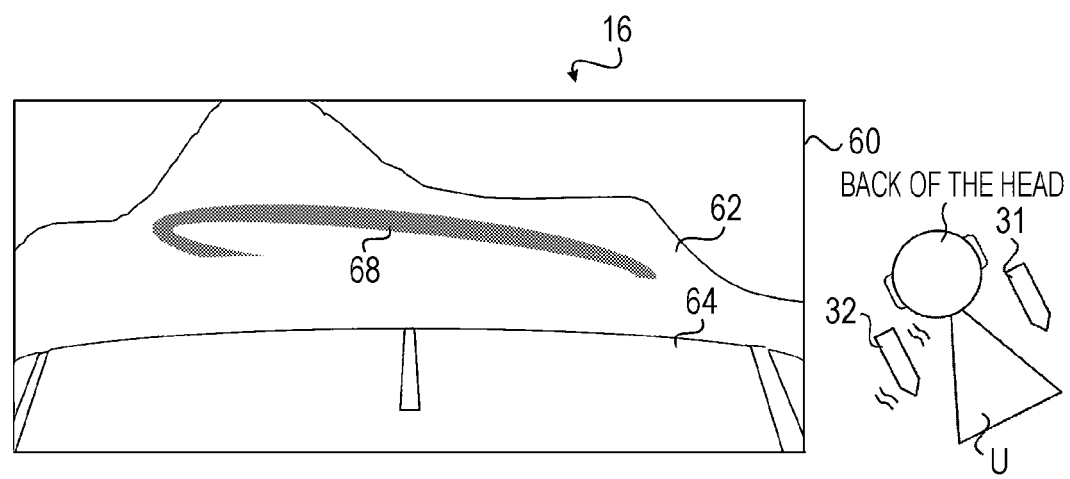
FIG. 19 illustrates another example of the marker and another example of the posture that a user is supposed to assume when the motion of a video image is a right-turning motion according to the second exemplary embodiment.

FIG. 19 illustrates another example of the marker 68 and another example of the posture that the user U is supposed to assume when the motion of the video image 60 is a right-turning motion according to the second exemplary embodiment.

As shown in FIG. 19, not only the three-dimensional position of the head of the user U, but also that of each of the first and second controllers 31 and 32, may be reflected in an instruction provided to the user U. In this case, the first and second sensors 41 and 42 detect the three-dimensional position of the head of the user U and also that of each of the first and second controllers 31 and 32.

Based on the detection results of the first and second sensors 41 and 42, the instructor 56 provides an instruction to the user U so that the positional relationship between the head of the user U and the first and second controllers 31 and 32 will be that shown in FIG. 19. In this case, as the positional relationship between the head of the user U and the first and second controllers 31 and 32 approaches that shown in FIG. 19, the instructor 56 may decrease the vibration period of the second controller 32. The positional relationship shown in FIG. 19 indicates that the first and second controllers 31 and 32 lean in the direction in which the user U leans.

In the above-described example, a combination of a visual instruction using the marker 68 and a tactile instruction using the first and second controllers 31 and 32 is used. However, only one of the two types of instructions may be used. Alternatively, a visual instruction using the marker 68 may be provided first, and then, the posture of the user U may be detected. If the user U does not assume a proper posture, a tactile instruction using the first and second controllers 31 and 32 may be provided.

As a visual instruction in the second exemplary embodiment, an instruction using blinking light may be provided or an instruction using characters may be provided.

As a tactile instruction in the second exemplary embodiment, a simpler instruction may be provided. For example, only one of the first and second controllers 31 and 32 is vibrated once to instruct the user to lean to the direction in which the vibration occurs. Conversely, a more precise instruction may be provided. For example, after the second controller 32 is vibrated, if the user is found to lean to the left excessively, the first controller 31 is vibrated. Alternatively, certain devices, such as low-frequency therapeutic devices, may be fixed to the front, back, left, and right portions of the body of the user, and one of the devices may be vibrated to instruct the user to lean to the direction of the vibrating device.

Third Exemplary Embodiment

Figure 20:
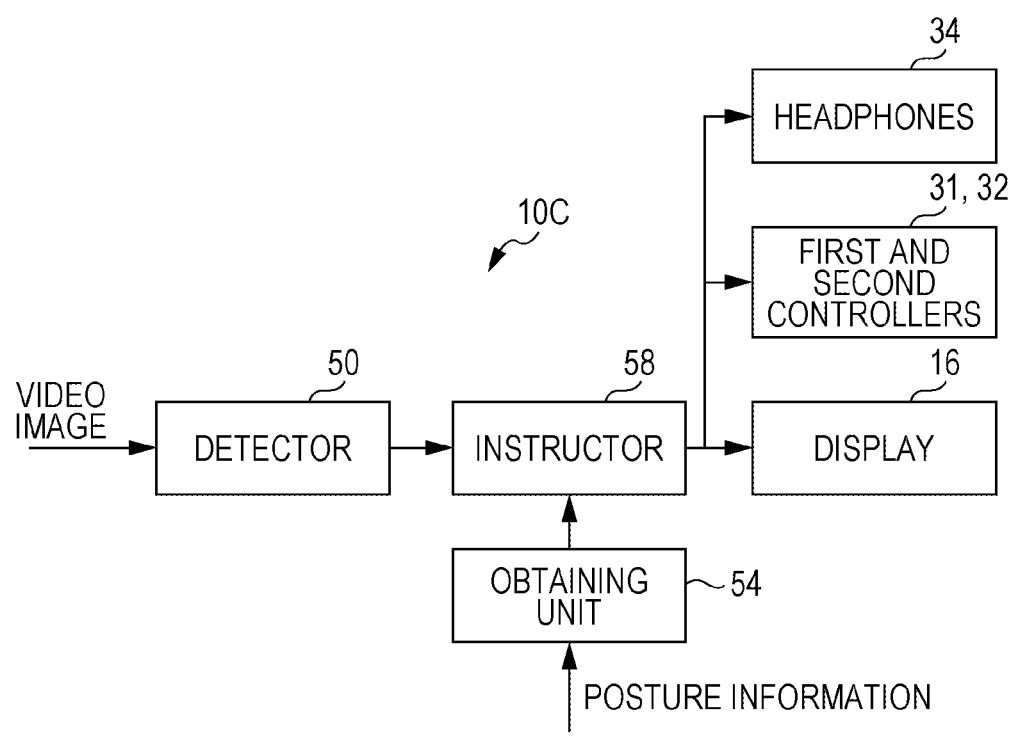
FIG. 20 is a block diagram illustrating an example of the functional configuration of an information processing apparatus according to a third exemplary embodiment.

FIG. 20 is a block diagram illustrating an example of the functional configuration of an information processing apparatus 10C according to a third exemplary embodiment.

As shown in FIG. 20, the information processing apparatus 10C includes a detector 50, an instructor 58, an obtaining unit 54, a display 16, first and second controllers 31 and 32, and headphones 34. Elements having the same functions as those of the first and second exemplary embodiments are designated by like reference numerals, and an explanation thereof will thus be omitted.

The headphones 34 in the third exemplary embodiment are an example of a sound output unit that outputs sound to the user U to provide an auditory instruction. In the third exemplary embodiment, the headphones 34 are worn on the head of the user U.

The instructor 58 provides an instruction by changing the directivity of sound output from the headphones 34 in accordance with the motion of a video image. For example, the instructor 58 may output sound that is audible only by one of the left and right ears of the user U so as to instruct the user U to lean to the direction in which the user U hears the sound.

In the third exemplary embodiment, among a visible instruction using the marker 68, a tactile instruction using the first and second controllers 31 and 32, and an auditory instruction using the headphones 34, two or more types of instructions may be used together. Alternatively, one of the three types of instructions may be used singly.

In the first through third exemplary embodiments, the information processing apparatus and the display are integrally formed. However, the information processing apparatus and the display may be formed separately. For example, the information processing apparatus may be implemented as an external server device, and the external server device may be connected to the display via a network.

In the first through third exemplary embodiments, a vehicle is used as an example of the moving body in which video images are captured. However, another moving body, such as an airplane or a ship, may be applicable.

The first through third exemplary embodiments have been discussed in the form of an information processing apparatus. The exemplary embodiments may be in the form of a program for causing a computer to execute the individual functions of the information processing apparatus. The exemplary embodiments may also be in the form of a computer readable storage medium storing this program.

The configurations of the information processing apparatuses discussed in the first through third exemplary embodiments are only examples. Various modifications may be made without departing from the spirit and scope of the invention.

The processing of the program described in the flowchart is also only an example. Steps may be added, deleted, changed, or replaced without departing from the spirit and scope of the invention.

In the first through third exemplary embodiments, the processing is implemented by a software configuration using a computer as a result of executing the program. However, the exemplary embodiments may be implemented by a hardware configuration or a combination of hardware and software configurations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to execute:
a detector configured to detect a motion of a video image viewed by a user; and
an instructor configured to provide to the user an instruction to assume a posture in accordance with the motion of the video image detected by the detector,
wherein the instructor is configured to, if a direction of the motion of the video image is in a first direction, then provide to the user an instruction to assume a posture to make a head of the user lean in a second direction opposite to the first direction.

2. The information processing apparatus according to claim 1, wherein the at least one processor is further configured to execute:
an obtaining unit configured to obtain posture information indicating a posture of the user.

3. The information processing apparatus according to claim 2, wherein the instructor is further configured to, if the posture of the user indicated by the posture information obtained by the obtaining unit is not a predetermined posture corresponding to the motion of the video image, then provide to the user an instruction to assume the predetermined posture.

4. The information processing apparatus according to claim 3, wherein the instructor is further configured to, if the posture of the user indicated by the posture information is the predetermined posture corresponding to the motion of the video image, then not provide the instruction.

5. The information processing apparatus according to claim 1, wherein the instructor is further configured to, if a direction of the motion of the video image is upward, downward, leftward, or rightward, then provide to the user an instruction to assume a posture in accordance with the direction of the motion of the video image.

6. The information processing apparatus according to claim 5, wherein:
the instructor is further configured to, if the direction of the motion of the video image is upward, then provide to the user an instruction to assume a posture to make the head lean backward;
the instructor is further configured to, if the direction of the motion of the video image is downward, then provide to the user an instruction to assume a posture to make the head lean forward;
the instructor is further configured to, if the direction of the motion of the video image is rightward, then provide to the user an instruction to assume a posture to make the head lean leftward; and
the instructor is further configured to, if the direction of the motion of the video image is leftward, then provide to the user an instruction to assume a posture to make the head lean rightward.

7. The information processing apparatus according to claim 1, wherein the instructor is further configured to, if the motion of the video image is acceleration or deceleration, then provide to the user an instruction to assume a posture in accordance with the motion of the video image.

8. The information processing apparatus according to claim 7, wherein:
the instructor is further configured to, if the motion of the video image is acceleration, then provide to the user an instruction to assume a posture to make the head lean backward; and
the instructor is further configured to, if the motion of the video image is deceleration, then provide to the user an instruction to assume a posture to make the head lean forward.

9. The information processing apparatus according to claim 1, wherein the instructor is further configured to provide the instruction as at least one of a visual instruction, a tactile instruction, and an auditory instruction.

10. The information processing apparatus according to claim 9, further comprising:
a display configured to display a marker together with the video image,
wherein the instructor is further configured to provide the instruction as the visual instruction to the user by changing a shape of the marker in accordance with the motion of the video image.

11. The information processing apparatus according to claim 10, wherein the instructor is further configured to provide the instruction by changing the shape of the marker in accordance with acceleration in the motion of the video image.

12. The information processing apparatus according to claim 9, further comprising:

a vibrator configured to contact part of the body of the user, wherein the instructor is further configured to provide the instruction as the tactile instruction by changing a state of vibration of the vibrator in accordance with the motion of the video image.

13. The information processing apparatus according to claim 9, wherein the at least one processor is further configured to execute a sound output unit configured to output sound to the user, wherein the instructor is further configured to provide the instruction as the auditory instruction by changing directivity of sound output from the sound output unit in accordance with the motion of the video image.

14. A non-transitory computer readable medium storing a program that, if executed, causes a computer to execute a process comprising:

detecting a motion of a video image viewed by a user; and providing to the user an instruction to assume a posture in accordance with the detected motion of the video image, wherein, if a direction of the motion of the video image is in a first direction, the instruction comprises an instruction to assume a posture to make a head of the user lean in a second direction opposite to the first direction.

15. The information processing apparatus according to claim 1, wherein information about the posture is determined using the motion of the video image detected by the detector.

16. The information processing apparatus according to claim 1, wherein the instruction comprises a direction of the posture, and wherein the direction of the posture is determined using a direction of the motion of the video image detected by the detector.

17. The information processing apparatus according to claim 1, wherein the instructor is configured to, if the direction of the motion of the video image is upward, then provide to the user an instruction to assume a posture to make the head lean backward; and wherein the instructor is configured to, if the direction of the motion of the video image is downward, then provide to the user an instruction to assume a posture to make the head lean forward.

18. The information processing apparatus according to claim 1, wherein the instructor is configured to, if the direction of the motion of the video image is rightward, then provide to the user an instruction to assume a posture to make the head lean leftward, and wherein the instructor is configured to, if the direction of the motion of the video image is leftward, then provide to the user an instruction to assume a posture to make the head lean rightward.

* * * * *